United States Patent
Yamamura et al.

(10) Patent No.: US 8,818,602 B2
(45) Date of Patent: Aug. 26, 2014

(54) UNMANNED AUTONOMOUS OPERATING SYSTEM

(71) Applicant: Honda Motor Co., Ltd., Tokyo (JP)

(72) Inventors: Makoto Yamamura, Wako (JP); Junichi Eguchi, Wako (JP); Jin Nishimura, Wako (JP); Toshiaki Kawakami, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/889,854

(22) Filed: May 8, 2013

(65) Prior Publication Data
US 2013/0317680 A1    Nov. 28, 2013

(30) Foreign Application Priority Data
May 23, 2012   (JP) .................. 2012-117570

(51) Int. Cl.
G05D 1/00   (2006.01)
G05D 1/02   (2006.01)

(52) U.S. Cl.
CPC .............. G05D 1/021 (2013.01); G05D 1/0276 (2013.01)
USPC ................. 701/22; 701/23; 180/168

(58) Field of Classification Search
CPC ........... G05D 1/00; G05D 1/02; G05D 1/021; G05D 1/0227; G05D 1/0276; G01S 17/00; G01S 17/93; G01S 1/00; G01S 1/70
USPC ................. 701/22, 23, 24, 36, 300, 301, 408; 180/168, 169; 56/10.2 F, 10.2 R; 318/580, 587

See application file for complete search history.

(56) References Cited

U.S. PATENT DOCUMENTS

| | | | | |
|---|---|---|---|---|
| 3,381,456 A | * | 5/1968 | Taylor | 56/10.2 A |
| 4,716,530 A | * | 12/1987 | Ogawa et al. | 701/23 |
| 5,281,901 A | * | 1/1994 | Yardley et al. | 318/587 |
| 6,255,793 B1 | * | 7/2001 | Peless et al. | 318/580 |
| 8,433,467 B2 | * | 4/2013 | Ross-Martin | 701/23 |

FOREIGN PATENT DOCUMENTS

| | | |
|---|---|---|
| EP | 1512053 | 5/2007 |
| JP | 4246701 | 4/2009 |

OTHER PUBLICATIONS

European Search Report dated Oct. 11, 2013, EP Application 13168808.7, 9 pages.

* cited by examiner

Primary Examiner — Richard Camby
(74) Attorney, Agent, or Firm — Rankin, Hill & Clark LLP

(57) ABSTRACT

In an unmanned autonomous operating system having a station provided with a signal generator for supplying an area signal in electric pulse current to an area wire that defines an operating area, and an unmanned autonomous vehicle having magnetic sensors for detecting a magnetic field generated by the area wire and a microcomputer programmed to recognize the operating area from the detected magnetic field, a selection mechanism is installed at the station that outputs one of area signals from the signal generator in response to a selection of a user, one of the area signals generated from the signal generator is registered, and the operating area is recognized based on the registered area signal.

20 Claims, 15 Drawing Sheets

TIME PERIOD FOR RECEIVING 5 PULSES: 39 msec. ~ 41 msec. FOR PULSE RECURRENCE TIME 10 msec.
TIME PERIOD FOR RECEIVING 5 PULSES: 47 msec. ~ 49 msec. FOR PULSE RECURRENCE TIME 12 msec.
TIME PERIOD FOR RECEIVING 5 PULSES: 55 msec. ~ 57 msec. FOR PULSE RECURRENCE TIME 14 msec.
TIME PERIOD FOR RECEIVING 5 PULSES: 63 msec. ~ 65 msec. FOR PULSE RECURRENCE TIME 16 msec.

UNMANNED AUTONOMOUS OPERATING SYSTEM

BACKGROUND

1. Technical Field

Embodiments of this invention relate to an unmanned autonomous operating system, particularly to a system having a charge station installed with a current supplier adapted to supply or transmit an electric pulse current to an area wire that defines an operating area and an unmanned autonomous operating vehicle adapted to autonomously run about the operating area to perform operation using a mounted operating machine such as rotary blades.

2. Background Art

As shown in FIG. 19, such an unmanned autonomous operating vehicle (now assigned with reference numeral 10) is configured to detect a magnetic field, more precisely a direction of the magnetic field generated in the area wire 72 by the pulse current (i.e., area signal) supplied through the current supplier of the charge station 74 with the use of a magnetic sensor installed on the vehicle, to recognize the operating area 70 and to conduct the operation in the area 70.

In that case, as shown in FIG. 20, operating areas 70 may sometimes be contiguous with each other. If the are, it will be difficult to recognize each of the operating areas 70 accurately as the intensity of the received signal is disadvantageously weakened since pulse current reception time may be equal to each other in the adjacent vehicle sensors or directions of the magnetic field in the adjacent wires may be opposite so that they can be canceled with each other. Such a disadvantage will be increased as number of contiguous operating areas 70 increases as illustrated in FIG. 21.

In view of the above, there is proposed to use a single kind of electric pulse current for operating areas, but the current is limited its reception time within a predetermined time window so as to enhance recognition accuracy even when such a single kind of the current is commonly used for operating areas, as taught by Japanese patent No. 4246701 which is corresponding to European patent EP 1 512 053 B1.

SUMMARY

The reference is thus configured to enhance recognition accuracy of the operating area. However, since the recognition is conducted by merely limiting the pulse current reception times within a predetermined time window, the area recognition accuracy is not always satisfactory.

An object of embodiments of the invention is therefore to overcome the foregoing drawback by providing an unmanned autonomous operating system having a charge station installed with a current supplier adapted to supply an electric pulse current to an area wire defining a vehicle operating area, which system recognizes the area accurately even when a plurality of operating areas are contiguous with each other.

In order to achieve the object, the embodiment of the invention provides in its first aspect an unmanned autonomous operating system having a station and an unmanned autonomous vehicle, the station having a signal generator for supplying an area signal in electric pulse current to an area wire that defines an operating area, the vehicle having an operating machine, prime movers for driving wheels, magnetic sensors for detecting a magnetic field generated by the area wire and a microcomputer programmed to recognize the operating area from the detected magnetic field and control to run about in the operating area to perform an operation using the operating machine, comprising: a selection mechanism installed at the station and adapted to allow one of a plurality of the area signals to be outputted from the signal generator in response to a selection of a user; and the microcomputer is configured to function as; an area signal register that registers the one of the area signals outputted from the signal generator (84c) through the selection mechanism as a registered area signal; and an operating area recognizes that recognizes the operating area based on the registered area signal.

In order to achieve the object, the embodiment of the invention provides in its second aspect a method for controlling an unmanned autonomous operating system having a station and an unmanned autonomous vehicle, the station having a signal generator for supplying an area signal in electric pulse current to an area wire that defines an operating area, the vehicle having an operating machine, prime movers for driving wheels, magnetic sensors for detecting a magnetic field generated by the area wire and a microcomputer programmed to recognize the operating area from the detected magnetic field and control to run about in the operating area to perform an operation using the operating machine, comprising the steps of: registering the one of the area signals outputted from the signal generator through a selection mechanism installed at the station and adapted to allow one of a plurality of the area signals to be outputted from the signal generator in response to a selection of a user; and recognizing the operating area based on the registered area signal.

BRIEF DESCRIPTION OF DRAWINGS

The above and other objects and advantages will be more apparent from the following description and drawings in which.

DESCRIPTION OF EMBODIMENTS

An unmanned autonomous operating system according to a first embodiment of the present invention will now be explained with reference to the attached drawings.

Figure 1:
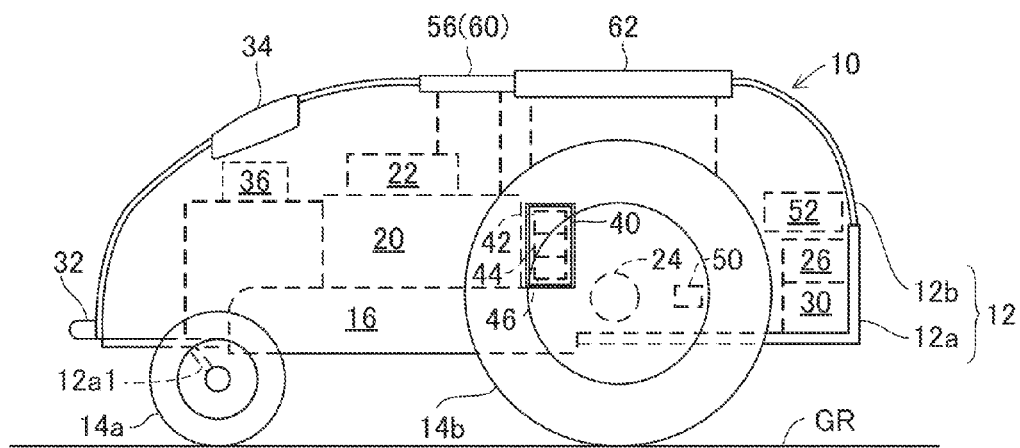
FIG. 1 is a side view of an unmanned autonomous operating system according to a first embodiment of the invention.
Figure 2:
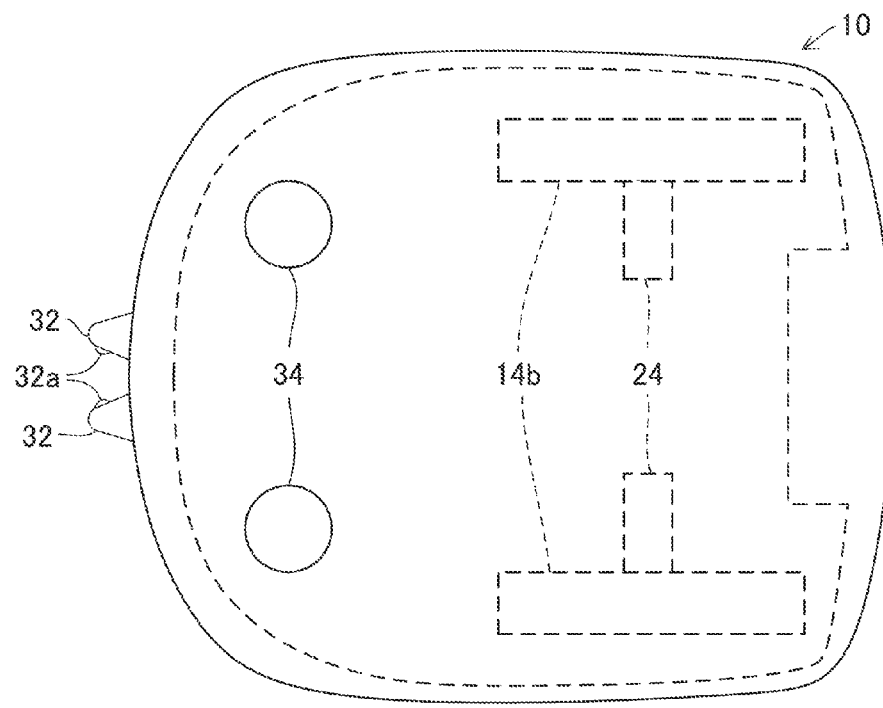
FIG. 2 is a plan view of the vehicle shown in FIG. 1.
Figure 3:
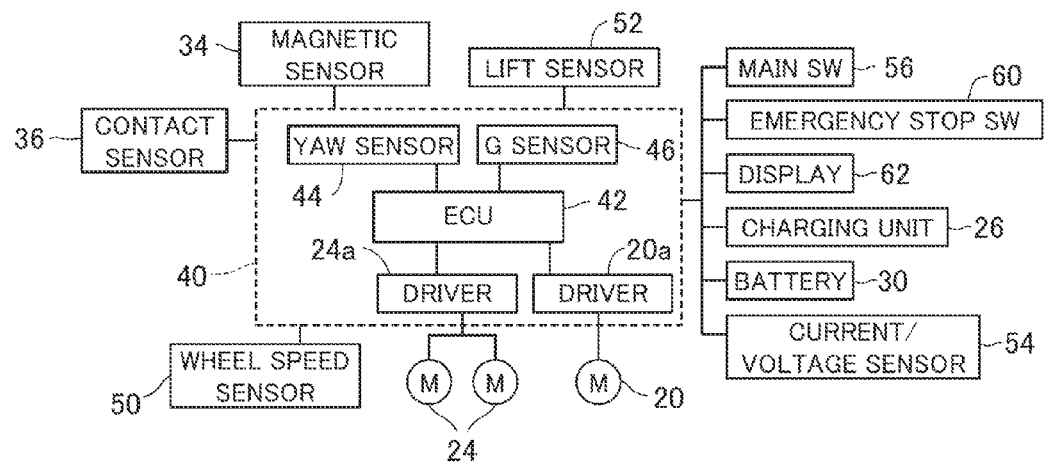
FIG. 3 is a block diagram showing input and output of devices mounted on the vehicle shown in FIG. 1.
Figure 4:
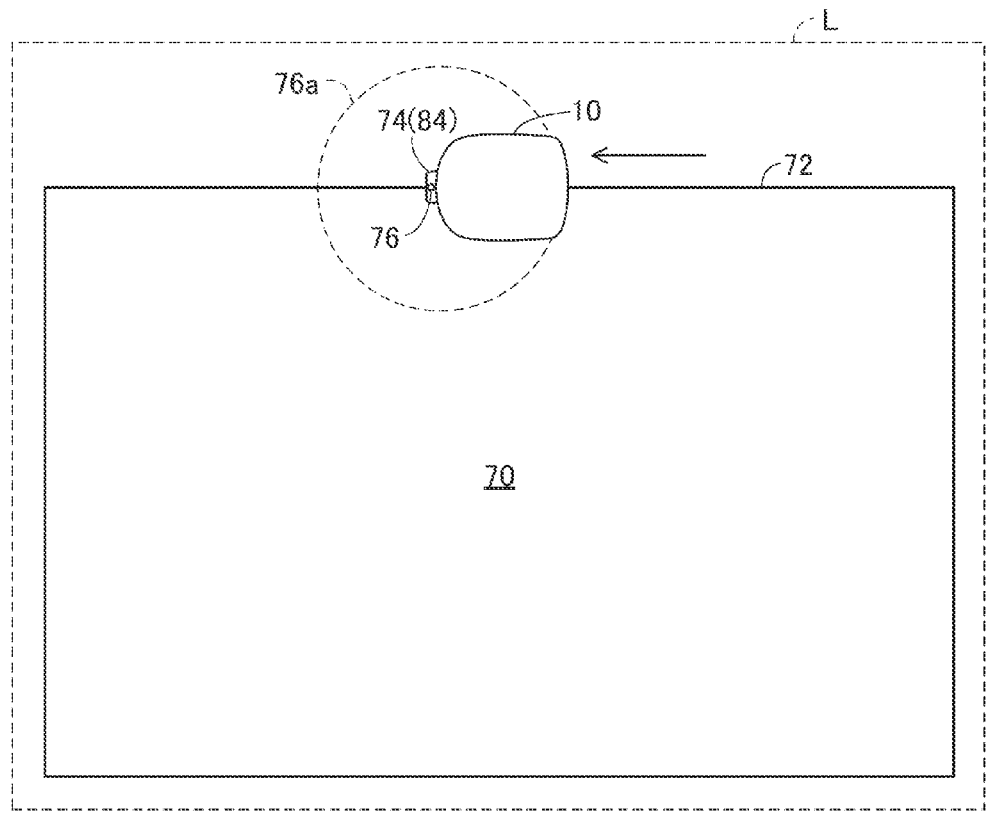
FIG. 4 is a plan view showing an operating area where the vehicle shown in FIG. 1 is to be run.
Figure 5:
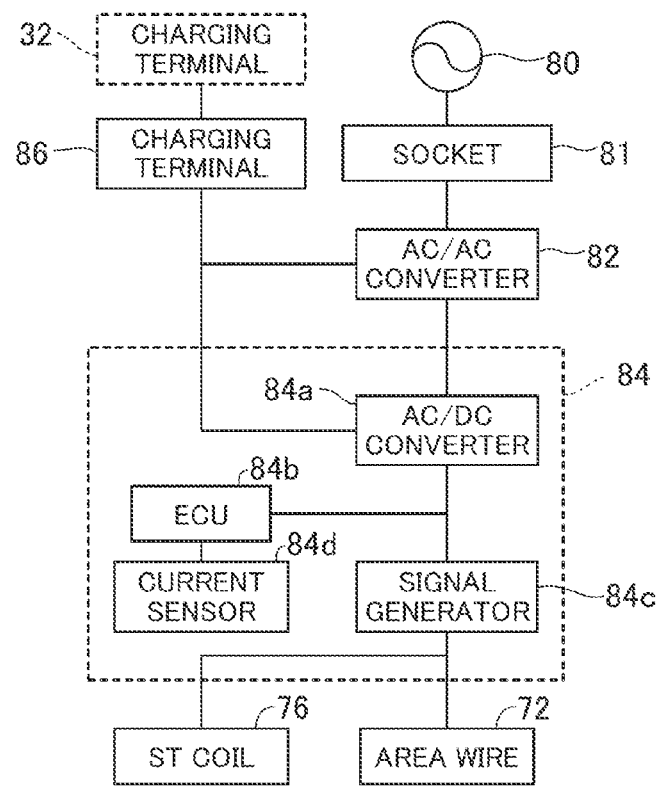
FIG. 5 is a block diagram showing the configuration of the charge ST (station) shown in FIG. 4.
Figure 6:
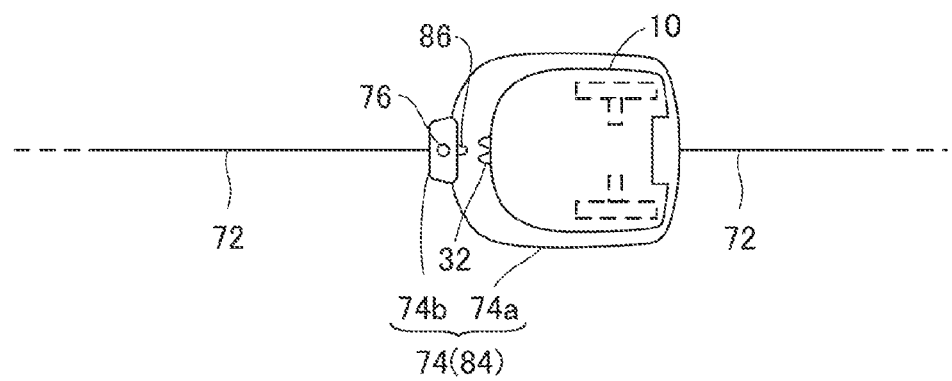
FIG. 6 is an explanatory view showing a charging process at the charge ST shown in FIG. 5.
Figure 7:
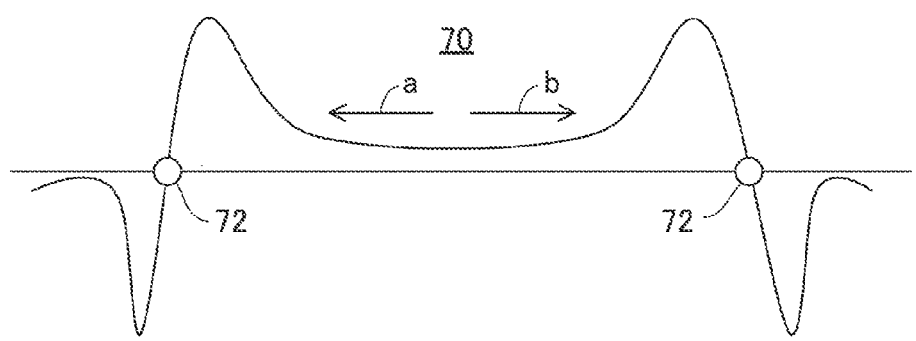
FIG. 7 is an explanatory view showing a magnetic field generated around an area wire embedded in the operating area shown in FIG. 4.

FIG. 1 is a side view of an unmanned autonomous operating system according to a first embodiment of the invention, FIG. 2 is a plan view of the vehicle shown in FIG. 1, FIG. 3 is a block diagram showing input and output of devices mounted on the vehicle shown in FIG. 1, FIG. 4 is a plan view showing an operating area where a station (charge station) is installed, FIG. 5 is block diagram showing the configuration of the station, FIG. 6 is an explanatory view showing a charging process at the station, FIG. 7 is an explanatory view showing a magnetic field generated in an area wire embedded in the operating area shown in FIG. 4.

In the figures symbol 10 indicates an unmanned autonomous operating vehicle. The vehicle 10 has a vehicle body 12 and wheels 14. The body 12 includes a chassis 12a and a frame 12b attached to the chassis 12a, while the wheels 14 include right and left front wheels 14a of a relatively small diameter that are fixed on the forepart of the chassis 12a through a stay 12a1, and right and left rear wheels 14b of a relatively large diameter that are directly attached to the chassis 12a.

Blades (rotary blades; operating machine) 16 for mowing lawn are attached in the center or thereabout of the chassis 12a, and an electric motor (hereinafter called the "operating motor") 20 is installed above the blades 16. The blades 16 are connected to the operating motor 20 to be driven and rotated thereby.

The blades 16 are also connected to a blade height adjustment mechanism 22 to be manually manipulated by a user (operator). The blade height adjustment mechanism 22 is equipped with a screw (not shown) to be manually turned by the user for adjusting the height of the blades 16 from a contacting ground GR.

Two electric motors (prime movers; hereinafter called the "running motors") 24 are attached to the chassis 12a of the vehicle 10 to the rear of the blades 16. The running motors 24 are connected to the right and left rear wheels 14b to operate them so that the rear wheels 14b are rotated in the normal (forward running) direction or reverse (backward running) direction independently of each other to make the vehicle 10 run on the ground GR. In other words, the front wheels 14a serve as the free wheels while the rear wheels 14b serve as the driven wheels. The blades 16, operating motor 20, running motors 24, etc., are covered by the frame 12b.

A charging unit (including an AC/DC converter) 26 and battery 30 are accommodated at the rear of the vehicle 10 and two charging terminals 32 are attached to the frame 12b at the front of the vehicle 10 to protrude forward to be connectable with the charging device. Each of the terminals 32 has a contact point 32a on a side facing the other contact point 32a.

The terminals 32 are connected to the charging unit 26 through wiring and the charging unit 26 is connected to the battery 30 through wiring. The operating and running motors 20, 24 are connected to the battery 30 through wiring to be supplied with power therefrom. The wiring is not illustrated in FIGS. 1 and 2.

Thus, the vehicle 10 is constituted as a four-wheel, unmanned, electric autonomous operating vehicle (lawn-mowing vehicle) that is, for instance, about 600 millimeters long, 300 millimeters wide and 300 millimeters high.

A front end of the vehicle 10 is installed with two, i.e., right and left magnetic sensors 34. The frame 12b is attached with a contact sensor 36. When the frame 12b comes off from the chassis 12a upon having contact with an obstacle and such, the contact sensor 36 outputs an ON signal.

A housing box is provided in the center or thereabout of the vehicle 10 to house a board 40 on which an Electronic Control Unit (ECU; Controller) 42 including a microcomputer having a CPU, ROM, RAM, etc., is installed. The board 40 is also installed in the vicinity of the ECU 42 with a Yaw sensor (angular velocity sensor) 44 that produces an output or signal indicative of angular velocity (yaw rate) generated about a z-axis in the center of gravity of the vehicle 10 and with a G sensor (acceleration sensor) 46 that produces an output or signal indicative of an acceleration G acting on the vehicle 10 in the X, Y and Z (three-axis) directions.

A wheel speed sensor 50 is installed near the rear (driven) wheel 14b to produce an output or signal representing a wheel speed thereof. A lift sensor 52 is installed between the chassis 12a and frame 12b to output an ON signal when the frame 12b is lifted from the chassis 12a by the user or the like.

A current/voltage sensor 54 is installed at the battery 30 to produce an output or signal indicative of SOC (State Of Charge) of the battery 30. The vehicle 10 is installed with a main switch 56 and emergency stop switch 60 to be manipulated by the user.

The outputs of the foregoing magnetic sensors 34, contact sensor 36, Yaw sensor 44, G sensor 46, wheel speed sensor 50, lift sensor 52, current/voltage sensor 54, main switch 56 and emergency stop switch 60 are sent to the ECU 42.

The upper surface of the frame 12b of the vehicle 10 is widely cut away and a display 62 is installed therein. The display 62 is connected to the ECU 42 to show a mode of the vehicle's status such as an operating mode in response to a command sent from the ECU 42.

Next, the explanation will be made on the operating area 70 where the vehicle 10 is to run or move about.

The operating area 70 is defined by an area wire (electric wire or cable) 72 that is embedded (laid) along a border of land L. A charge ST (station) 74 is provided on the area wire 72. Note that the vehicle 10 in FIG. 4 is exaggerated in size.

The charge ST 74 is disposed with an ST coil 76. A magnetic field radiated from the ST coil 76 forms a charging device detecting area 76a of a circle with center at the charge ST 74 with a radius of about one meter. Thus, the charge ST (charging device) 74 is disposed with the coil 76 radiating a magnetic field that forms a charging device detecting area around the charge ST 74.

As shown in FIG. 5, the charge ST 74 has a charging device 84 connected to a commercial power source 80 through a socket 81 and an AC/AC converter (transformer) 82, and a charging terminal 86 that is connected to the charging device 84 and connectable to the contact points 32a of the charging terminals 32 of the vehicle 10 (shown in FIG. 2) through its contact points.

The charging device 84 has an AC/DC converter 84a that is connected to an AC/AC converter 82 through a cable 83, an Electronic Control Unit (ECU) 84b that includes a microcomputer similarly to the ECU 42 and controls the operation of the AC/DC converter 84a, and a signal generator 84c that supplies or transmits electric pulse current to the area wire 72 to generate signals therearound and to the ST coil 76 (when no current is to be supplied to the area wire 72).

In the charging device 84, the ECU 84b starts operation to control the current supply to the area wire 72 and ST coil when the socket 81 is connected to the commercial power source 80.

Alternating current coming from the commercial power source 80 through the socket 81 is appropriately stepped down by the AC/AC converter 82 of the charging device 84 and, when the vehicle 10 is returned and connected to the charge ST 74 through the charging terminals 32 and 86, the current is sent to the vehicle 10 to charge the battery 30 through the charging unit 26.

The alternating output of the AC/AC converter 82 is inputted to AC/DC converter 84a of the charging device 84 through the cable 83 and is converted to a direct voltage/current. Specifically, the output is stepped down to approximately 5V and 40V in two kinds of direct voltage by a DC/DC converter (not shown) installed in the AC/DC converter 84a.

The direct current of 5V outputted from the AC/DC converter 84a is sent to the ECU 84a as operating power and the other direct current of 40V is sent to the signal generator 84c. The signal generator 84c generates a pulse current whose height is approximately 40V from the sent direct current and supplies or transmits to the area wire 82 and ST coil 76. The area wire 72 is installed with a current sensor 84d which detects the current flowing through the area wire 72 and outputs the detected current to the ECU 84b.

The recognition or detection of the operating area 70 will be explained.

Upon power supply from the signal generator 84c, a magnetic field is generated around the area wire 72. The intensity of the magnetic field varies depending on the entire length of the area wire 72 and also the intensity and direction of the magnetic fields vary depending on a distance from the area wire 72 as shown in FIG. 7.

The direction and intensity of the magnetic field of the area wire 72 is detected by the magnetic sensors 34 attached to the vehicle 10 and the detected results are sent to the ECU 42. Based on the detected results, the ECU 42 recognizes or detects a position of the subject vehicle (unmanned autonomous operating vehicle 10) with respect to the area wire 72, i.e., whether the subject vehicle is positioned inside or outside the operating area 70.

More specifically, the ECU 42 recognizes the operating area 70 by detecting the direction of the magnetic field generated around the area wire 72 through the magnetic sensor 34.

In addition, the ECU 42 detects the distance of the subject vehicle from the area wire 72 (defining the border of the operating area 70). More specifically, as shown in FIG. 7, when the subject vehicle is moved from the inside of the operating area 70 towards the outside thereof in a direction indicated by an arrow a, as the distance from the area wire 72 is reduced (as the subject vehicle is moved closer to the area wire 72), the intensity of the magnetic field is gradually increased on a positive side and afterward, decreased.

When the subject vehicle is positioned on the area wire 72, the intensity becomes zero. Subsequently, when the distance from the area wire 72 is again increased, the intensity exhibits the similar characteristics on a negative side. Also when the subject vehicle is moved from the inside of the operating area 70 towards the outside thereof in the opposite direction indicated by an arrow b, the characteristics similar to the above pattern are exhibited. The ECU 42 detects the distance of the subject vehicle from the wire 72 based on the characteristics mentioned above.

The operation of the vehicle 10 will be explained.

The height of the blades 16 is manually adjusted by the user through the blade height adjustment mechanism 22 in accordance with a growing condition of the lawn in the operating area 70. When the main switch 56 is switched on so that the ON signal is outputted, the ECU 42 starts to be operated and enters the operating mode to mow the lawn.

In the operating mode, the ECU 42 calculates a power supply control value such that a vehicle speed detected from the output of the wheel speed sensor 50 becomes a predetermined speed, and supplies the calculated value to the running motors 24 through a driver 24a to make the vehicle 10 run about.

Further, the ECU 42 calculates a power supply control value in such a manner that rotational speeds of the blades 16 become a prescribed speed, and supplies the calculated value to the operating motor 20 through a driver 20a to operate the blades 16 to perform the operation.

To be more specific, in the operating mode, the ECU 42 makes the vehicle 10 run about randomly (or in accordance with an operation pattern) to perform the operation within the operating area 70. When determining that the vehicle 10 has moved out of the operating area 70 based on the outputs of the magnetic sensors 34, the ECU 42 changes a running direction detected based on the output of the Yaw sensor 44 by a predetermined angle so that the vehicle 10 moves backward to the inside of the operating area 70.

Since the right and left rear (driven) wheels 14b are configured so that they are driven by the running motors 24 to rotate in the normal and reverse directions independently or separately from each other, when the motors 24 are rotated in the normal direction at the same speed, the vehicle 10 is run straight, whilst when they are rotated in the normal direction at different speeds, the vehicle 10 is turned toward a side of lower rotational speed.

When one of the motors 24 is rotated in the normal direction and the other is rotated in the reverse direction, since the rear wheels 14b are rotated in the same direction as the associated motor's rotation, the vehicle 10 is turned at the same position (which is so-called pivot turn).

Thus, in the operating mode, the ECU 42 makes the vehicle 10 run about within the operating area 70 while changing the running direction thereof randomly whenever the vehicle 10 reaches the area wire 72, and drives the blades 16 to perform the operation.

Further, in the operating mode, the ECU 42 monitors the SOC of the battery 30 based on the output of the current/voltage sensor 54 and when the remaining battery level is decreased to a predetermined level, transitions to a return mode in which the vehicle 10 is returned to the charge ST 74 to charge the battery 30 by the charging device 84.

In the operating mode and return mode, when any of the contact sensor 36, lift sensor 52 and emergency stop switch 60 produces the ON signal, the ECU 42 stops the operating and running motors 20, 24 to stop the operation and running of the vehicle 10.

Figure 20:
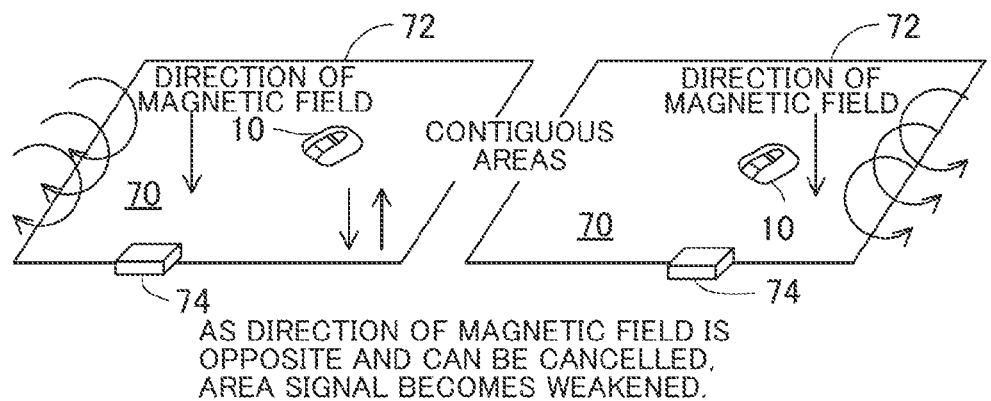
FIG. 20 is an explanatory view showing disadvantage when the operating areas are contiguous with each other.
Figure 21:
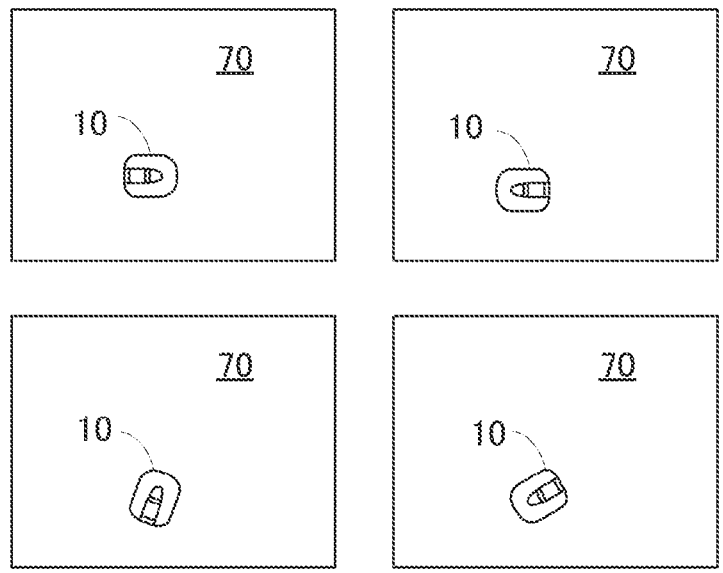
FIG. 21 is an explanatory view showing the case where the number of contiguous operating area is increased.

Here, explaining the object of the invention once again, as shown in FIG. 20, if operating areas are contiguous with each other, it becomes difficult to recognize the operating area 70 accurately, since the intensity of the received signals is disadvantageously weakened. This is because pulse current reception times may be equal to each other in the adjacent vehicle sensors 34 or the directions of the magnetic field in the adjacent wires 72 may be opposite and canceled with each other. In view of the above, an object of the invention is therefore to overcome the foregoing drawback and to recognize the area accurately even when operating areas 70 are contiguous with each other.

For that purpose, the embodiment of the invention is configured to have a selection mechanism 90 adapted to allow one from among a plurality of pulse currents (area signals) prepared beforehand to be outputted from the signal generator 84*c* to the charge ST 74 in response to a selection of the user.

Figure 8:
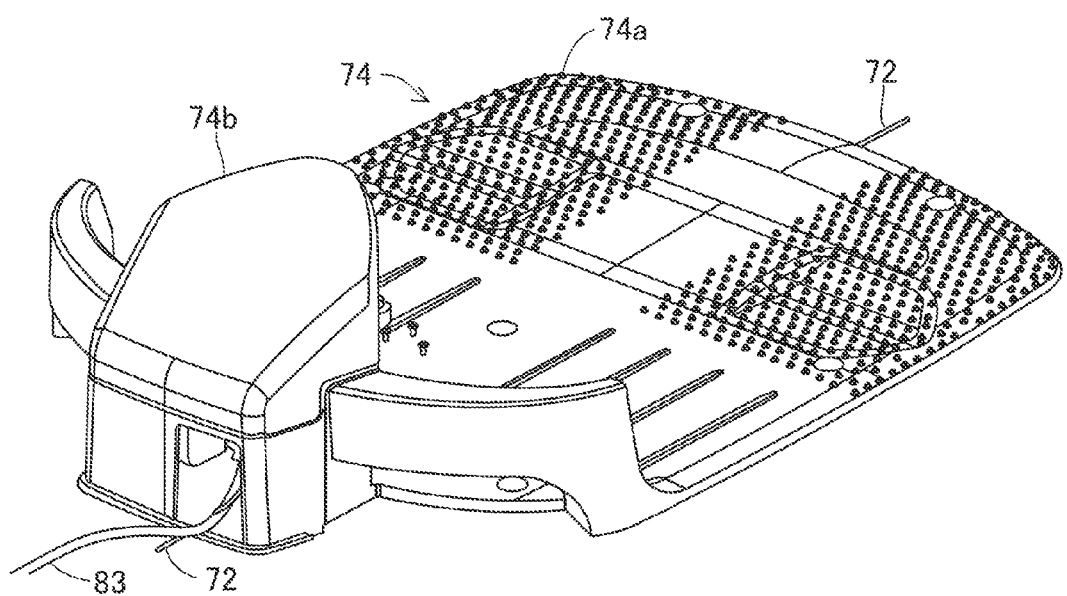
FIG. 8 is a perspective view entirely showing the charge ST illustrated in FIG. 4.
Figure 9:
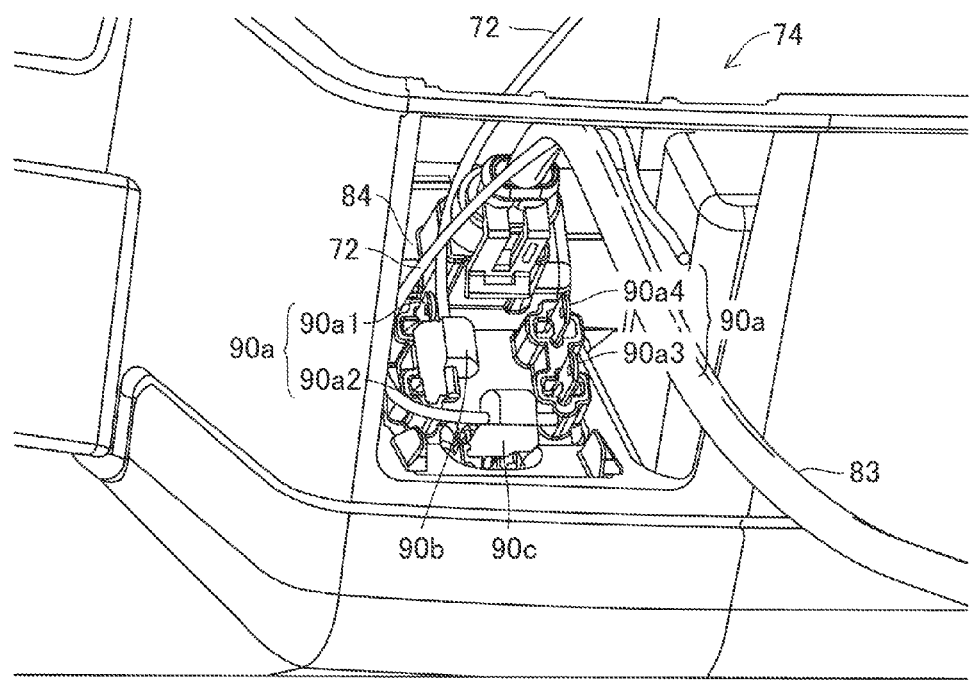
FIG. 9 is a perspective view partially showing the bottom of the charge ST illustrated in FIG. 8.

FIG. 8 is a perspective view entirely showing the charge ST 74 and FIG. 9 is a perspective view partially showing the bottom of the charge ST 74.

As illustrated, the charge ST 74 has a platform 74*a* for accommodating the vehicle 10 and a housing 74*b* provided next to the platform 74*a*. Although not shown, the housing 74*b* is installed with the aforesaid charging terminal 86 at a side facing the platform 74*a* and is installed with the charging device 84 therein.

As best shown in FIG. 9, the charge ST 74 is provided with the selection mechanism 90 that comprises a plurality of output terminals 90*a*, more precisely four output terminals 90*a*1, 90*a*2, 90*a*3, 90*a*4 and a terminal 90*b* adapted to be connectable with one of the output terminals 90*a*. The four output terminals 94*a* are connected to the signal generator 84*c* (not shown in FIG. 9) and are adapted to allow one from among a plurality of pulse currents prepared beforehand to be outputted in response to a selection (manipulation) of the user.

Figure 10:
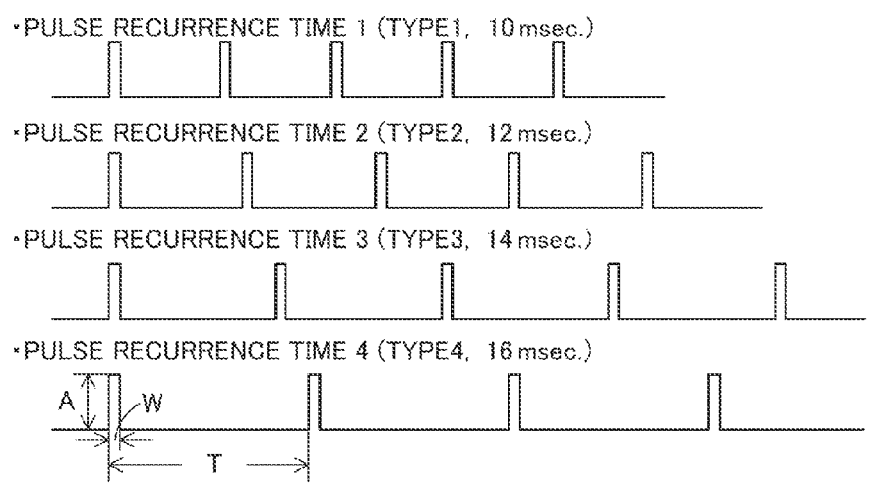
FIG. 10 is an explanatory view showing a plurality of pulse currents that can be outputted from output terminals of a selection mechanism installed in the charge ST illustrated in FIG. 9.

FIG. 10 is an explanatory view showing a plurality of pulse currents that can be outputted from the output terminals 90*a*. As illustrated, the plurality of pulse currents comprises four (kinds of) pulse currents.

The four pulse currents are equal in the height (strength or magnitude) A in 5V and the duration (length or width) W, but are different in the pulse recurrence time T. Specifically, the four pulse currents have pulse recurrence times 1, 2, 3, 4 of, in the order from the above, 10 msec. 12 msec., 14 msec., and 16 msec.

From now on, the four pulse currents are named as "area signals" and are identified by type numbers (identifier) comprising type 1, type 2, type 3 and type 4. When the four output terminals 90*a* are connected to the area wire 72 through the terminal 90*b* by the user, they are configured such that the first output terminal 90*a*1 outputs (supplies) the area signal of type 1, the second output terminal 90*a*2 outputs the area signal of type 2, the third output terminal 90*a*3 outputs the area signal of type 3 and the fourth output terminal 90*a*4 outputs the area signal of type 4.

Figure 11:
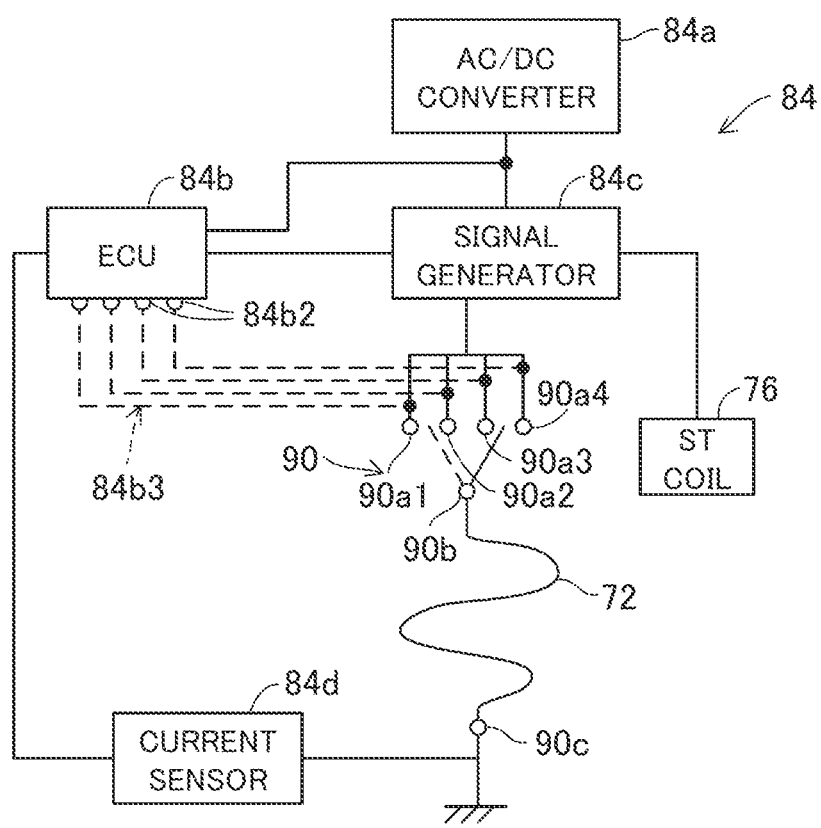
FIG. 11 is a block diagram showing the structure of the output terminals of the selection mechanism installed in the charge ST and the signal generator and ECU illustrated in FIG. 5.

FIG. 11 is a block diagram showing the structure of the output terminals 90*a*, signal generator 84*c* and ECU 84*b*.

As shown, the four output terminals 90*a* of the selection mechanism 90 are connected to four input ports 84*b*2 of the ECU 84*b* through lines 84*b*3 respectively. The electric potential (voltage) of the input ports 84*b*2 are H level (e.g., 5V) when any of the output terminals 90*a* are not connected to the area wire 72 through the terminal 90*b* by the user, and are L level (e.g., 0V) when any of the terminals 90*a* are connected to the wire 72.

A current sensor 84*d* is installed at a location between a common (ground) terminal 90*c* and the ground and produces an output (indicative of the current flowing thereof) which is sent to the ECU 84*b*. Accordingly, based on the electric potential at the input port 84*b*2, the ECU 84*b* can identify which one of the four output terminals 94*a*, i.e., which type of the area signals is selected by the user and based thereon, controls operation of the signal generator 84*c* to generates the one corresponding to the selected area signal, more precisely the one of the area signals whose pulse recurrence time is corresponding to the selected area signal.

Thus, the embodiment is configured to have the selection mechanism 90, (installed in the charge ST 74 and having the output terminals 90*a*, terminal 90*b* and ECU 84*b*), adapted to allow one from among a plurality of area signals prepared beforehand to be outputted from the signal generator 84*c* to the area wire 72 in response to the selection of the user.

Figure 12:
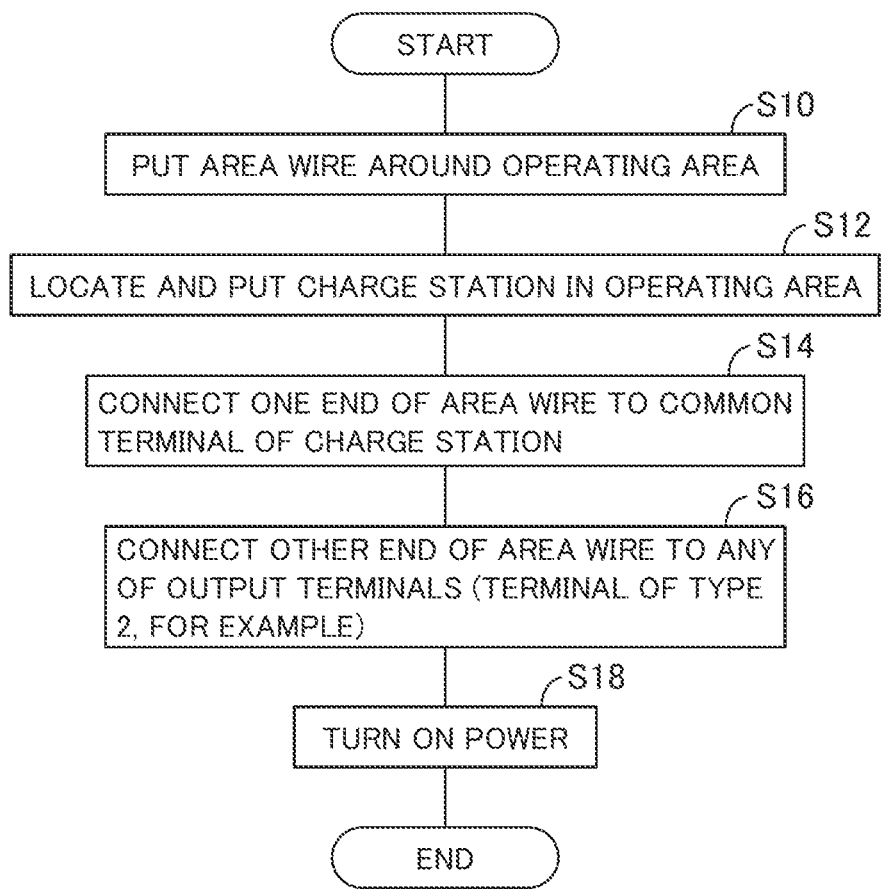
FIG. 12 is a flowchart showing the user's preparatory operation at the side of charge ST to be done prior to the vehicle's lawn mower operation.
Figure 13:
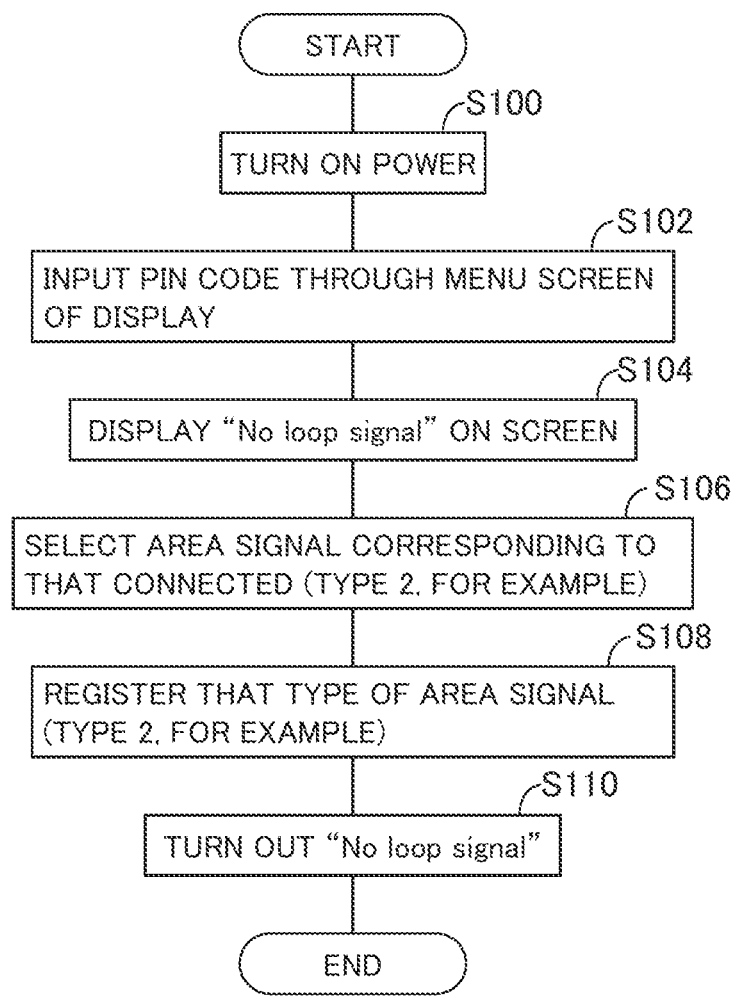
FIG. 13 is a flowchart similarly showing pulse current registering operation at the side of vehicle to be done by the user prior to the vehicle's lawn mower operation.

FIG. 12 is a flowchart showing the user's preparatory operation at the charge ST 74 side to be done prior to the vehicle 10's lawn mower operation and FIG. 13 is a flowchart similarly showing area signal registering operation at the side of vehicle 20 to be done by the user prior to the vehicle's lawn mower operation.

Explaining the flowchart of FIG. 12, while referring to FIGS. 8 to 11, firstly the user needs to put the area wire 72 on the surface of the earth or bury it under the earth around a place (like that shown in FIG. 4) scheduled as the operating area 70 (S 10), and determine a location of the charge ST in the operating area 70 and put it there (S 12).

Then, the user needs to connect one end of the area wire 72 to the common terminal 90*c* (shown in FIG. 9) of the charge ST 74 (S 14), and connect the other end of the area wire 72 to any (e.g., the output terminal 90*a*2 for the area signal of type 2) from among four output terminals 90*a* shown in FIG. 8, through the terminal 90*b* (S16).

Then, the user needs to turn on power (S18). Specifically, the user connects the socket 81 to the commercial power source 80 to start the ECU 84*b*. With this, the area wire 72 in the operating area 70 is supplied with the area signal of type 2.

Explaining the area signal registering operation at the side of vehicle 10 made by the user with reference to the flowchart of FIG. 13, the user needs to turn on power by turning the main switch 56 on (S100), and needs to input a PIN code (user identification code) through input of menu screen on the display 62 (S102).

In response thereto, at the side of the vehicle 10, the ECU 42 determines whether the inputted PIN code is equal to an authentic code registered beforehand and if it is, displays as "No loop signal" on the screen of the display 62 (S 104). This means that the area signal outputted to the area wire 72 can not be detected.

When the display of "No loop signal" was made, the user needs to select the connected area signal corresponding to that connected in S16 of FIG. 12 flowchart by the type number (i.e., that of type 2) through the input of the menu screen on the display 62 (S106), and needs to register (set) the selected area signal by the type number (S 108). With this, the registration is accepted in the ECU 42 and the display of "No loop signal" is turned out or deleted (S110).

Then, the ECU 42 conducts the operation to recognize the operating area 70 based on the area signal whose registration is accepted in accordance with routine not shown. In other words, to display "No loop signal" in S104 means to urge the user to register the area signal by the type number outputted from the signal generator 84c through the selection mechanism 90.

As the processing at S102 and onward is conducted when the inputted PIN code is determined to be authentic, the processing at S104 and onward means to initiate the operating area recognition in response to the input of the PIN code.

Figure 14:
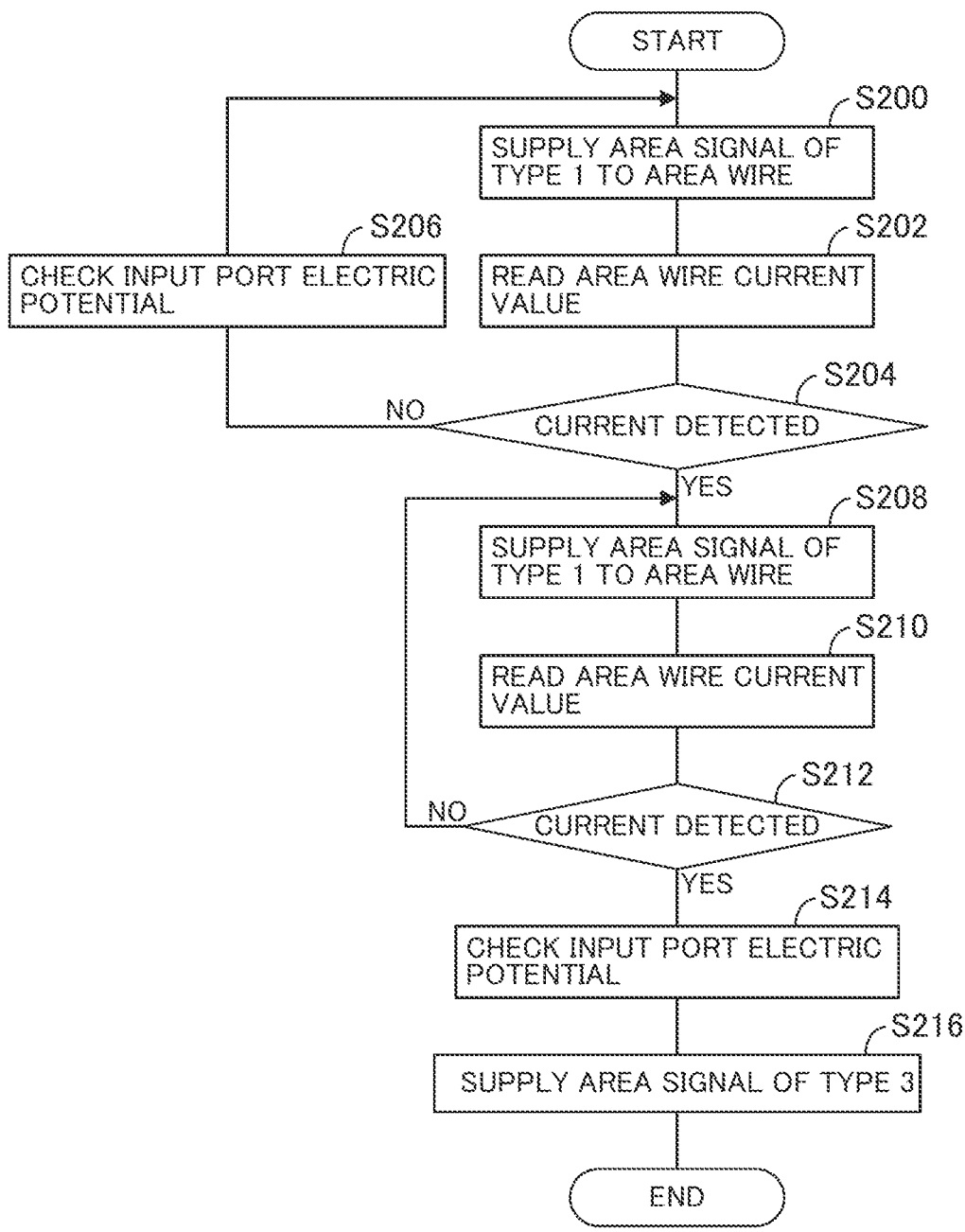
FIG. 14 is a flowchart showing the operation of the unmanned autonomous operating system according to the first embodiment, i.e. the operation made by the ECU at the charge ST side under a situation where area signal interference occurs in the adjacent operating areas after the start of the vehicle's lawn mower operation.

FIG. 14 is a flowchart showing the operation of the system according to the first embodiment, i.e. the operation made by the ECU 84b at the charge ST 74 side when the area signals are mixed with each other in the adjacent operating area 70 after the start of the vehicle's lawn mower operation. In the case shown in the flowchart, type 1 of the area signal has once registered, but is then changed to type 3 due to the signal mixture.

Explaining this, the program starts in S200, in which the area signal of type 1 is supplied or transmitted to the area wire 72, and proceeds to S202, in which a current value (output of the current sensor 84d) of the area wire 72 is detected, and to S204, in which it is determined whether a current is detected.

The determination of S204 is normally negative, and the program proceeds to S206, in which the electric potential of the input port 84b2 is checked and the area signal corresponding to the electric potential of the input port 84b2 whose level is L to be outputted from one of the output terminal 90a of the selection mechanism 90 (i.e., the area signal of type 1) is supplied or transmitted from the output terminal 90a (i.e., 90a1) to the area wire 72.

On the other hand, the determination of S204 is affirmative, when the user is about to change the connection of the output terminal 90a of the selection mechanism 90 due to area signal interference in the adjacent operating areas 70 and the current supply is being temporarily shut out.

In that case, the program proceeds to S208, in which the area signal of type 1 is also supplied to the area wire 72, to S210, in which a current value of the area wire 72 is read, and to S212, in which it is determined whether a current is detected. Insofar as the result in S212 is negative, the program proceeds back to S208 and the above processing is repeated.

On the contrary, when one (from among the output terminals 90a of the selection mechanism 90) corresponding to the area signal of type 3, for example, is connected by the user, the determination at S212 is affirmative. Accordingly, the program proceeds to S214, in which the electric potential of the input port 84b2 is checked, and to S216, in which the area signal of the type number that is corresponds to the input port 84b2 whose level is L (specifically the signal of type 3) is supplied to the area wire 72.

As stated above, since the first embodiment is configured to have the selection mechanism 90 (in the charge ST 74) adapted to allow one from among a plurality of area signals in pulse current prepared beforehand to be outputted as the area signal from the signal generator 84c in response to a selection of the user, it becomes possible to recognize the operating area 90 accurately even when the operating area 70 happens to be contiguous with other.

Further, since the area signals are made different in the pulse recurrence time T, it becomes possible to generate the area signal easily.

Further, since it is configured such that the registration of the area signal outputted from the signal generator 84c by the type number (identifier code) is accepted and the operating area 70 is recognized by the type number of the area signal whose registration is accepted, it becomes possible to recognize the operating area 70 accurately and surely. In addition, it becomes possible to output one of the area signals as desired by the user with simple structure.

Furthermore, since it is configured such that the user is urged to register the area signal outputted from the signal generator 84c by the type number through the selection mechanism 90, more precisely through the output terminal 90a of the mechanism 90, prior to starting of the recognition of the operating area 70, it becomes possible to recognize the operating area 70 more surely. And since it is configured such that the recognition of the operating area 70 is started when the PIN code is inputted, it becomes possible to protect the vehicle from thefts and crib.

Figure 15:
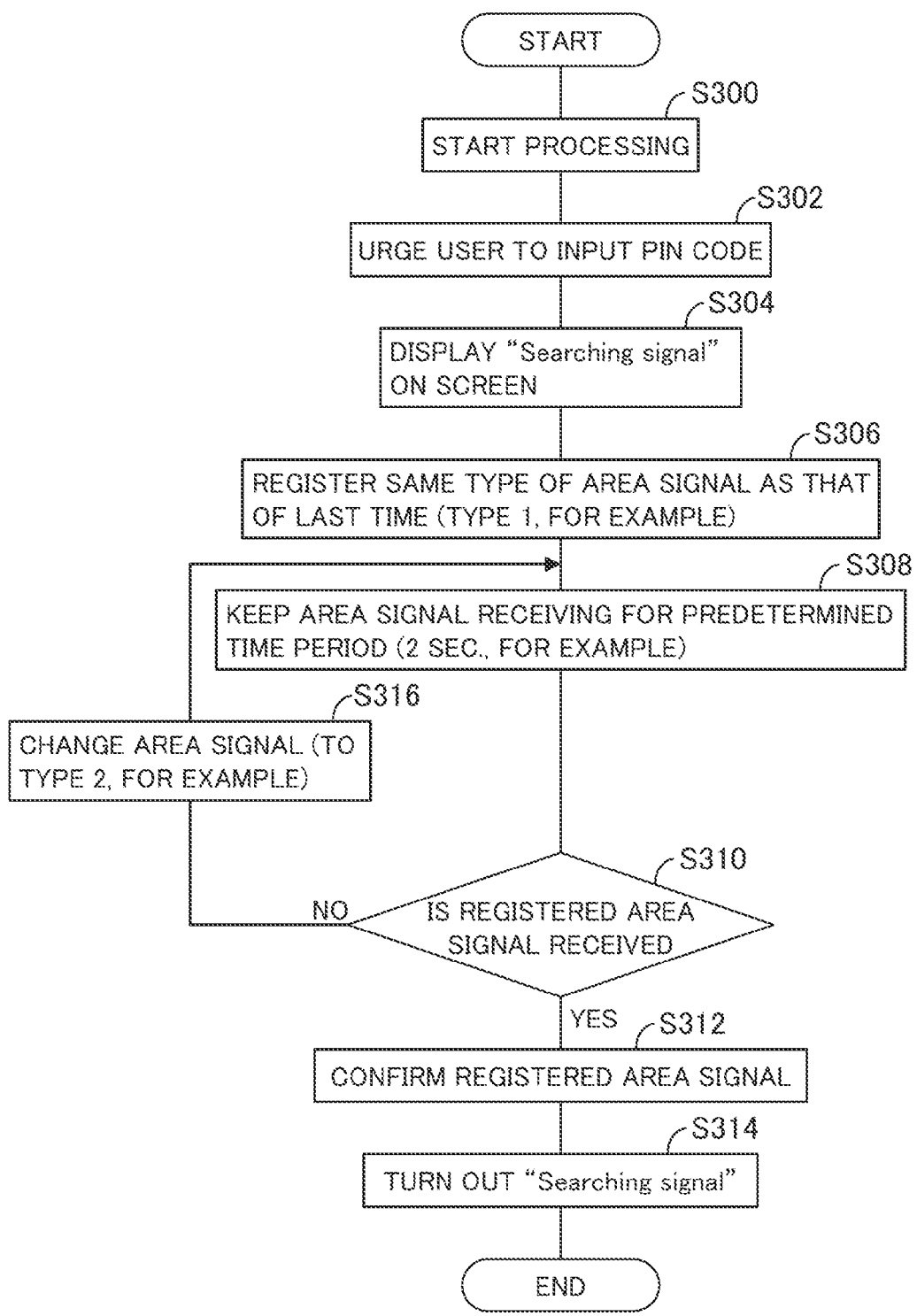
FIG. 15 is a flowchart showing the operation of the unmanned autonomous operating system according a second embodiment of the invention.

FIG. 15 is a flowchart showing the operation of the unmanned autonomous operating system according a second embodiment of the invention, particularly to the operation of the area signal registration by the type number at the side of the vehicle 10 prior to the lawn mower operation. The illustrated program is executed by the ECU 42 at every predetermined time intervals.

Explaining this, the program starts processing when the main switch 56 is turned on by the user in S300, and proceeds to S302, in which the user is urged to input the PIN code through the input of the menu screen on the display 62. When the PIN code is inputted and it is determined to be authentic, a display "Searching signal" is made on the display 62 in S304. This means that the recognition of the operating area 70 is in progress.

The program then proceeds to S306, in which the same type number of the area signal as that registered in the last time (time before the main switch 56 was turned off), for example, the area signal of type 2 is registered (set), to S308, in which the signal is kept received for a predetermined time period (e.g., 2 sec.), and to S310, in which it is determined whether the registered area signal is received.

Figure 16:
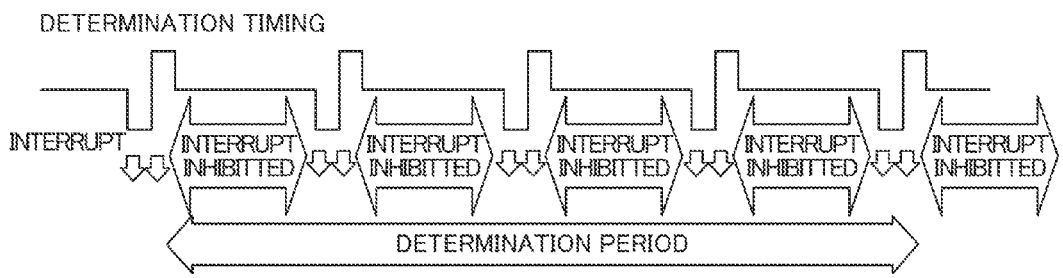
FIG. 16 is a time chart partially showing the operation of the flowchart of FIG. 15.

FIG. 16 is a time chart partially showing the operation of the flowchart of FIG. 15. Since the area signals are different in the pulse recurrence time by the type, the determination whether the received signal is the registered one is made by counting a total time period (determination time) during which the signal is received by five times and by discriminating whether the counted total time period is within a range (shown in FIG. 16) respectively set for each of the area signals.

As illustrated, the determination is made by interrupt at a predetermined determination timing at each pulses, and the interrupt is inhibited at rest of pulse intervals.

Returning to the explanation of FIG. 15, when the result is affirmative in S310, the program proceeds to S312, in which the area signal of that type number is confirmed, i.e., is registered and proceeds to S314, in which the display "Searching signal" is turned out or deleted.

On the other hand, when the result in S310 is negative, the program proceeds to S316, in which the area signal is changed to that of type 2, for example, and the program proceeds to S308 and onward where the above-mentioned processing is conducted until the determination in S310 becomes affirmative. Then, the lawn mower operation is conducted by the vehicle 10 in accordance with a routine not shown.

Figure 17:
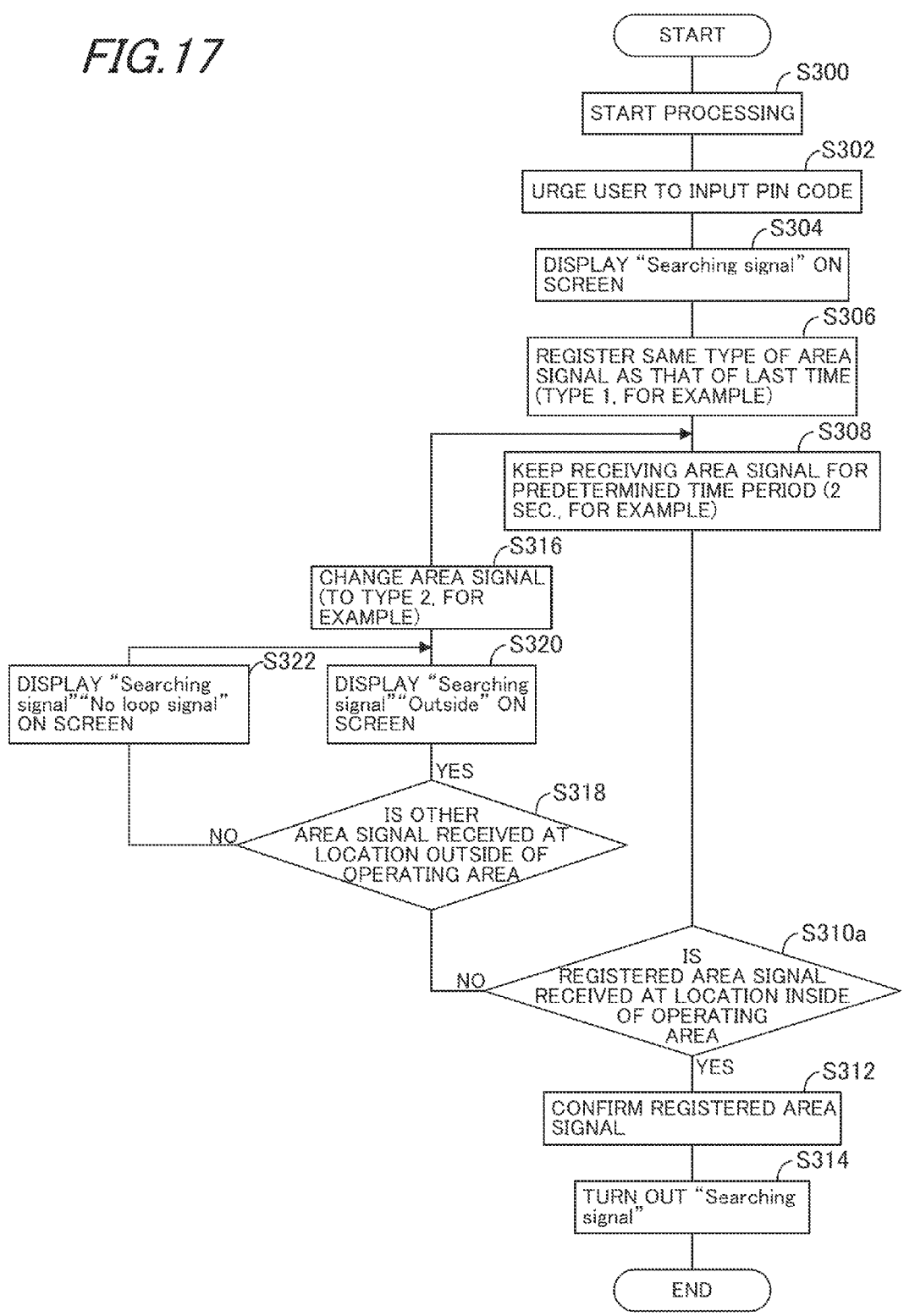
FIG. 17 is a flowchart showing a modification of the operation of the flowchart of FIG. 15.

FIG. 17 is a flowchart showing a modification of the operation of the second embodiment mentioned in the flowchart of FIG. 15.

Explaining this with focus on the differences from the above, the program proceeds from S300 to S308, and to S310a, in which it is determined whether the registered area signal is received at a location inside of the operating area 70.

When the result is negative, the program proceeds to S318, in which it is determined whether other area signal than that registered is received at a location outside of the operating area 70. In other words, it is determined whether the vehicle 10 is located outside the operating area 70 and any area signal other than the registered one, i.e., the area signal of type 2, or 3 or 4 is received.

When the result is affirmative in S318, the program proceeds to S320, in which displays of "Searching signal" and "Outside" are made on the display 58, to S316, in which the area signal is changed from that of type 1 to type 2, for example, and to S308 and onward. The display of "Outside" is to alert the user that the vehicle 10 is out of the operating area 70.

On the other hand, when the result in S318 is negative, since this means that the area signal can not be detected, the program proceeds to S322, in which in addition to the "Searching signal", a display of "No loop signal" is made on the display 58, to S316, in which the area signal is changed from that of type 1 to type 2, for example, and to S308 and onward.

As stated above, since the second embodiment is configured such that registration of the area signal outputted from the signal generator Mc by the type number through the selection mechanism 90 is conducted by the ECU 42 itself, prior to starting recognition of the operating area 70, it becomes possible to lighten the burden of the user. The other effects and advantages of the second embodiment are the same as those of the first embodiment.

Figure 18:
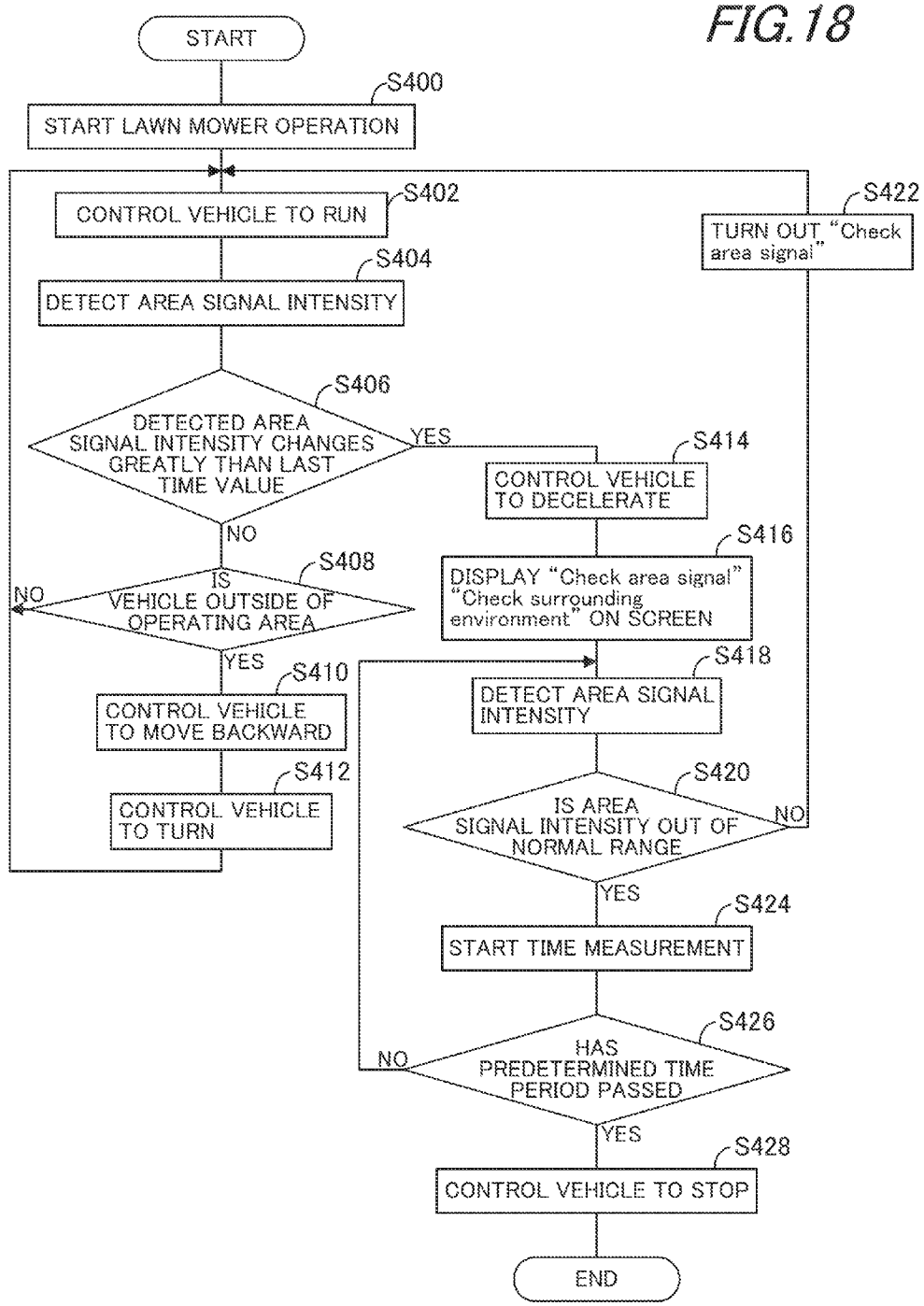
FIG. 18 is a flowchart showing the operation of the unmanned autonomous operating system according to a third embodiment of the invention.
Figure 19:
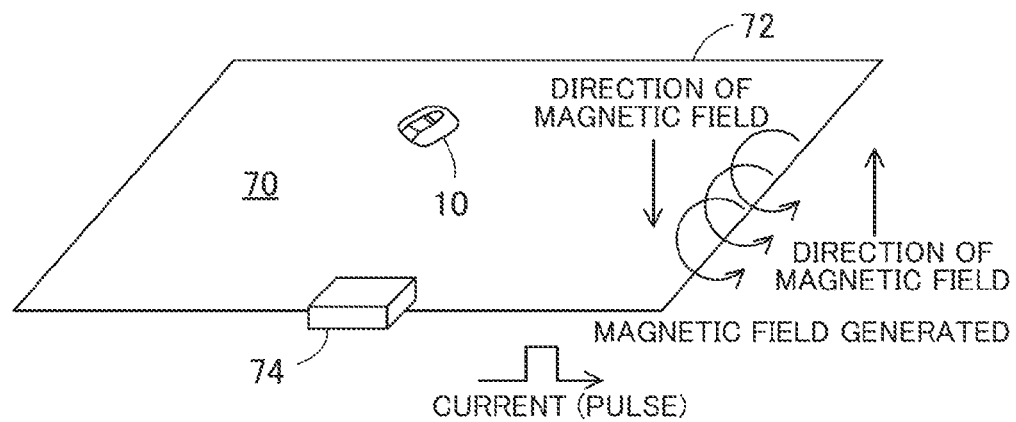
FIG. 19 is an explanatory view showing the recognition of operating area through detection of a magnetic field generated around an area wire by electric pulse current (area signal)

FIG. 18 is a flowchart showing the operation of the unmanned autonomous operating system according to a third embodiment of the invention, particularly to the operation of the vehicle 10a under a situation where there may exist an interference with other area signal. The illustrated program is executed by the ECU 42 at every predetermined time intervals.

Explaining this, the lawn mower operation is started in S400 and the program proceeds to S402, in which operation of the running motor 24 is controlled to make the vehicle 10 to run, and to S404, in which the intensity of the area signal is detected.

The program then proceeds to S406, in which it is determined whether the intensity of the area signal detected at this program loop changes greatly relative to that detected at the preceding (last) program loop.

When the result is negative, since this indicates that no interference occurs, the program proceeds to S408, in which it is determined whether the vehicle 10 is outside of the operating area 70 and when the result is affirmative, the program proceeds to S410, in which operation of the running motor 24 is controlled to make the vehicle moves backward, and to S412, in which operation of the running motor 24 is controlled to turn the vehicle 10. When the result in S408 is negative, the processing in S410, S412 is skipped.

On the other hand, when the result in S406 is affirmative, since this indicates that the interference may occur, the program proceeds to S414, in which the vehicle is controlled to decelerate, to S416, in which displays of "Check area signal" and "Check surrounding environment" are made on the display 64.

These indications are intended for the user to check surrounding environment, more particularly to urge the user to change the registered area signal, since there exists the possibility that the area signal of the same type is concurrently used in the neighbor(s). With this, the user is required to look around the surroundings to determine whether the interference exists and if so, the user can change the area signal.

The program then proceeds to S418, in which the intensity of the area signal is again detected, and to S420, in which it is determined whether the detected intensity of the area signal is out of a normal range. If the result is negative, the program proceeds to S422, in which the indication of "Check area signal" on the display 58 is turned out, and to S402 and onward.

On the other hand, when the result is affirmative in S420, the program proceeds to S424, in which time measurement is started, and to S426, in which it is determined whether a predetermined time period (e.g., 3 seconds) or more have passed. When the result is negative, the program proceeds back to S418, but when the result is affirmative, the program proceeds to S428, in which the vehicle 10 is controlled to stop, since there may be a problem in the vehicle 10 due to the interference of the area signal, etc.

As stated above, since the third embodiment is configured such that the possibility of the interference of the area signal with neighbor's is determined and to urge the user to change the area signal if the possibility exists, it becomes possible to recognize the operating area 70 accurately even when the operating area 70 happens to be contiguous with other.

The other effects and advantages of the third embodiment are the same as those of the first embodiment. In the third embodiment, the area signal outputted from the signal generator 84c through the selection mechanism 90 is registered and the operating area 70 is recognized in accordance with the processing illustrated in FIGS. 13 (or FIGS. 15 and 17).

As stated above, the embodiments are configured to have an unmanned autonomous operating system and method having a station (74) and an unmanned autonomous vehicle (10), the station (74) having a signal generator (84c) for supplying an area signal in electric pulse current to an area wire (72) that defines an operating area (70), the vehicle (10) having an operating machine (16), prime movers (24) for driving wheels (14), magnetic sensors (34) for detecting a magnetic field generated by the area wire (72) and a microcomputer (42, more precisely a microcomputer in the ECU 42) programmed to recognize the operating area (72) from the detected magnetic field and control to run about in the operating area (70) to perform an operation using the operating machine (16), comprising: a selection mechanism (90) installed at the station (74) and adapted to allow one of a plurality of the area signals to be outputted from the signal generator (84c) in response to a selection of a user; and the microcomputer (42) is configured to function as; an area signal register (S108, S312) that registers (more specifically, accepts registration of) the one of the area signals outputted from the signal generator (84c) through the selection mechanism (90) as a registered area signal; and an operating area recognizer that recognizes the operating area (70) based on the registered area signal (more specifically, area signal whose registration is accepted).

With this, it becomes possible to recognize the operating area 90 accurately even when the operating area 70 happens to be contiguous with other, and to recognize the operating area 70 accurately and surely. In addition, it becomes possible to output one of the area signals as desired by the user with simple structure.

In the system, the selection mechanism (90) has a plurality of output terminals (90a, i.e., 90a1, 90a2, 90a3, 90a4), one of which outputs the one of area signals in response to a selection of the user. With this, it becomes possible to recognize the operating area 70 more surely.

In the system, the area signal register urges the user to register the one of the area signals prior to the recognition of the operating area (S104). With this, it becomes possible to recognize the operating area 70 more surely even when the operating area 70 happens to be contiguous with other.

In the system, the area signal register registers the one of the area signals prior to the recognition of the operating area (70). With this, it becomes possible to lighten the burden of the user.

In the system, the operating area recognizer determines possibility of interference of the area signal with that of adjacent operating area and if the possibility exists, urges the user to change the registered area signal (S406-S416). With this, it becomes possible to recognize the operating area 70 more surely even when the operating area 70 happens to be contiguous with other.

In the system, the plurality of the area signals comprises electric pulse currents different in pulse recurrence time T. With this, it becomes possible to generate the area signal easily.

In the system, the operating area recognizer recognizes the operating area when a user identification code is inputted (S102, S302). With this, it becomes possible to protect the vehicle 10 from thefts and crib.

In the system, the selection mechanism (90) has an output terminal (90b) that is connectable to one of the output terminals (90a, 90a1, 90a2, 90a3) by the user such that the user selects one of the area signals. With this, it becomes possible to recognize the operating area 70 more surely with a simple structure.

In the system, the vehicle (10) has electric motors (20) adapted to be supplied with power from a battery. With this, it becomes possible to make operation with less noise.

In the system, the vehicle (10) has electric motors (20) adapted to be supplied with power from a battery. With this, it becomes possible to make operation with less noise.

In the system, the operating machine (16) comprises a lawn mower. With this, it becomes possible to the recognize the operating area 90 for lawn mower operation accurately even when the operating area 70 happens to be contiguous with other.

It should be noted that, in the foregoing, although the electric motor is applied as the prime mover, it may be an internal combustion engine or a hybrid of an engine and electric motor.

It should also be noted that, although the lawn-mowing blades are exemplified as the operating machine, but it should not be limited thereto and any machine can be applied if it is used for maintaining the appearance of the operating area.

Japanese Patent Application No. 2012-117570, filed on May 23, 2012 is incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An unmanned autonomous operating system having a station and an unmanned autonomous vehicle, the station having a signal generator for supplying an area signal in electric pulse current to an area wire that defines an operating area, the vehicle having an operating machine, prime movers for driving wheels, magnetic sensors for detecting a magnetic field generated by the area wire and a microcomputer programmed to recognize the operating area from the detected magnetic field and control to run about in the operating area to perform an operation using the operating machine, comprising:

a selection mechanism installed at the station and adapted to allow one of a plurality of the area signals to be outputted from the signal generator in response to a selection of a user; and the microcomputer is configured to function as;

an area signal register that registers the one of the area signals outputted from the signal generator through the selection mechanism as a registered area signal; and an operating area recognizer that recognizes the operating area based on the registered area signal.

2. The system according to claim 1, wherein the selection mechanism has a plurality of output terminals, one of which outputs the one of area signals in response to a selection of the user.

3. The system according to claim 1, wherein the area signal register urges the user to register the one of the area signals prior to the recognition of the operating area.

4. The system according to claim 1, wherein the area signal register registers the one of the area signals prior to the recognition of the operating area.

5. The system according to claim 1, wherein the operating area recognizer determines possibility of interference of the area signal with that of adjacent operating area and if the possibility exists, urges the user to change the registered area signal.

6. The system according to claim 1, wherein the plurality of the area signals comprises electric pulse currents different in pulse recurrence time.

7. The system according to claim 1, wherein the operating area recognizer recognizes the operating area when a user identification code is inputted.

8. The system according to claim 2, wherein the selection mechanism has an output terminal that is connectable to one of the output terminals by the user such that the user selects one of the area signals.

9. The system according to claim 1, wherein the vehicle has electric motors adapted to be supplied with power from a battery.

10. The system according to claim 1, wherein the prime movers comprises electric motors to be supplied with power from a battery.

11. The system according to claim 1, wherein the operating machine comprises a lawn mower.

12. An unmanned autonomous operating system having a station and an unmanned autonomous vehicle, the station having a signal generator for supplying an area signal in electric pulse current to an area wire that defines an operating area, the vehicle having an operating machine, prime movers for driving wheels, magnetic sensors for detecting a magnetic field generated by the area wire, an electronic control unit that recognizes the operating area from the detected magnetic field and controls to run about in the operating area to perform an operation using the operating machine, comprising:

a selection mechanism installed at the station and adapted to allow one of a plurality of the area signals to be outputted from the signal generator in response to a selection of a user; and the vehicle is provided with;

an area signal registering means for registering the one of the area signals outputted from the signal generator through the selection mechanism as a registered signal; and an operating area recognizing means for recognizing the operating area based on the registered area signal.

13. The system according to claim 12, wherein the selection mechanism has a plurality of output terminals, one of which outputs the one of area signals in response to a selection of the user.

14. A method for controlling an unmanned autonomous operating system having a station and an unmanned autonomous vehicle, the station having a signal generator for supplying an area signal in electric pulse current to an area wire that defines an operating area, the vehicle having an operating machine, prime movers for driving wheels, magnetic sensors for detecting a magnetic field generated by the area wire and a microcomputer programmed to recognize the operating area from the detected magnetic field and control to run about in the operating area to perform an operation using the operating machine, comprising the steps of:

registering the one of the area signals outputted from the signal generator through a selection mechanism installed at the station and adapted to allow one of a plurality of the area signals to be outputted from the signal generator in response to a selection of a user; and recognizing the operating area based on the registered area signal.

15. The method according to claim 14, wherein the selection mechanism has a plurality of output terminals, one of which outputs the one of area signals in response to a selection of the user.

16. The method according to claim 14, wherein the area signal register urges the user to register the one of the area signals prior to the recognition of the operating area.

17. The method according to claim 14, wherein the step of area signal registering registers the one of the area signals prior to the recognition of the operating area.

18. The method according to claim 14, wherein the step of operating area recognizing determines possibility of interference of the area signal with that of adjacent operating area and if the possibility exists, urges the user to change the registered area signal.

19. The method according to claim 14, wherein the plurality of the area signals comprises electric pulse currents different in pulse recurrence time.

20. The method according to claim 14, wherein the step of operating area recognizing recognizes the operating area when a user identification code is inputted.

\* \* \* \* \*